United States Patent Office 2,740,788
Patented Apr. 3, 1956

2,740,788

(−)-3-HYDROXY-N-PROPARGYL-MORPHINANES

Andreas Grüssner and Otto Schnider, Basel, Switzerland, assignors to Hoffmann-La Roche Inc., Nutley, N. J., a corporation of New Jersey No Drawing. Application August 5, 1954,
Serial No. 448,152

Claims priority, application Switzerland August 14, 1953

4 Claims. (Cl. 260—285)

It is known that N-allyl-normorphine and (−)-3-hydroxy-N-allyl-morphinane annihilate the breath-inhibiting effect and, with correspondingly higher doses, also the analgesic effect of compounds having a morphine-like activity. (−)-3-hydroxy-N-allyl-morphinane is effective in lower doses than N-allyl-normorphine but is more toxic.

It has been found that the hitherto unknown (−)-3-hydroxy-N-propargyl-morphinane annihilates the breath-inhibiting effect of compounds having a morphine-like activity to the same degree as the said N-allyl-morphinane compounds, but possesses a considerably lower toxicity than the latter, and, on the other hand, attenuates the analgesic effect only in very high doses. This surprising property is valuable in that the undesired secondary effects of compounds having a morphine-like activity can, to a high degree, be selectively suppressed by simultaneously administering the new compound.

According to the present invention the said new compound is prepared by heating (−)-3-hydroxy-morphinane (Helv. Chim. Acta 34, 2211 (1951)) with a propargyl halide in an organic solvent, preferably in a mixture of butanol and benzene, in the presence of an acid-binding agent, preferably an anhydrous alkali carbonate. The (−)-3-hydroxy-N-propargyl-morphinane obtained in this manner may be recrystallized from ethanol. After recrystallization the said compound melts at 198 to 200° C. By reacting the base with acids the corresponding salts can be obtained.

The present invention is illustrated but not limited by the following example.

Example 219 parts by weight of (−)-3-hydroxy-morphinane are dissolved in 6000 parts by volume of a mixture of butanol and benzene (1:1) at 60° C., and after slow dropwise addition of 90 parts by volume of propargyl bromide the mixture is stirred at a slightly elevated temperature in the presence of 126 parts by weight of anhydrous potassium carbonate. The still warm solution is filtered and concentrated in vacuo. The residue is dissolved in 6600 parts by volume of 1 N hydrochloric acid and the solution is treated with decolorizing carbon and filtered. The colorless solution is made alkaline to phenolphthalein with conc. ammonia and the base which precipitates is taken up in chloroform by shaking. The chloroform solution dried over sodium sulfate is concentrated in vacuo and the remaining (−)-3-hydroxy-N-propargyl-morphinane is crystallized from ethanol. The product melts at 198° to 200° C.

The water-soluble hydrobromide of (−)-3-hydroxy-N-propargyl-morphinane prepared from the base and hydrobromic acid and recrystallized from a mixture of methanol and ether melts at 160° to 161° C.; $[\alpha]_D^{20°}=-63°$ (c=3, in ethanol).

The tartrate of (−)-3-hydroxy-N-propargyl-morphinane prepared from the base and tartaric acid and crystallized from alcohol melts at 184° C.; $[\alpha]_D^{20°}=-45.7°$ (c=3.5, in water).

What we claim is:
1. A member of the group consisting of (−)-3-hydroxy-N-propargyl-morphinane and salts thereof.
2. (−)-3-hydroxy-N-propargyl-morphinane.
3. (−)-3-hydroxy-N-propargyl-morphinane hydrobromide.
4. (−)-3-hydroxy-N-propargyl-morphinane tartrate.

References Cited in the file of this patent

UNITED STATES PATENTS 2,364,833   Weijlard _____ Dec. 12, 1944

FOREIGN PATENTS 278,410   Switzerland _____ Feb. 16, 1952

OTHER REFERENCES

Braun: Berichte, vol. 49, pp. 977–89 (1916).
Schnider et al.: Helv. Chim. Acta., vol. 33, pp. 1437–48 (1950).